(12) United States Patent
Parks et al.

(10) Patent No.: US 8,520,214 B2
(45) Date of Patent: Aug. 27, 2013

(54) FIBER OPTICAL GYROSCOPE

(75) Inventors: Allen D. Parks, Spotsylvania, VA (US); Scott E. Spence, Fredericksburg, VA (US)

(73) Assignee: The United States of America as Represented by the Secretary of the Navy, Washington, DC (US)

(*) Notice: Subject to any disclaimer, the term of this patent is extended or adjusted under 35 U.S.C. 154(b) by 302 days.

(21) Appl. No.: 13/135,975

(22) Filed: Jul. 13, 2011

(65) Prior Publication Data
US 2013/0016342 A1    Jan. 17, 2013

(51) Int. Cl.
G01C 19/72 (2006.01)
G01C 19/64 (2006.01)
G01J 4/00 (2006.01)

(52) U.S. Cl.
USPC ............... 356/465; 356/364; 356/459

(58) Field of Classification Search
None
See application file for complete search history.

(56) References Cited

U.S. PATENT DOCUMENTS

| | | | | |
|---|---|---|---|---|
| 4,944,591 A * | 7/1990 | McMichael | | 356/460 |
| 5,208,652 A * | 5/1993 | Sonobe et al. | | 356/460 |
| 5,335,064 A * | 8/1994 | Nishiura et al. | | 356/460 |
| 5,420,684 A | 5/1995 | Carroll | | 356/350 |
| 5,465,150 A * | 11/1995 | Malvern | | 356/465 |
| 5,552,887 A * | 9/1996 | Dyott | | 356/465 |
| 5,610,714 A | 3/1997 | Malvern et al. | | 356/350 |
| 5,999,304 A * | 12/1999 | Sanders et al. | | 359/237 |
| 6,201,923 B1 | 3/2001 | Yuhara et al. | | 385/137 |
| 6,320,664 B1 * | 11/2001 | Kaliszek et al. | | 356/464 |
| 7,746,476 B2 | 6/2010 | Demers et al. | | 356/462 |
| 2004/0223160 A1 * | 11/2004 | Chen et al. | | 356/460 |
| 2010/0290057 A1 * | 11/2010 | Qiu et al. | | 356/461 |
| 2012/0001625 A1 * | 1/2012 | Yamada et al. | | 324/244.1 |

FOREIGN PATENT DOCUMENTS

| JP | 58196416 A | * | 11/1983 |
| JP | 62021016 A | * | 1/1987 |

OTHER PUBLICATIONS

Y. Aharonov et aL, "How the Result of a Measurement of a Component of the Spin of a Spin-½ Particle Can Turn Out to be 100", *Phys. Rev. Ltrs*, 60 (1988), 14 1351-54. http://www.tau.ac.il/~vaidman/lvhp/m8.pdf.
N. W. M. Ritchie et al., "Realization of a Measurement of a 'Weak Value'", *Phys. Rev. Lett*, 66 (1991) 1107-1110.

(Continued)

*Primary Examiner* — Gregory J Toatley
*Assistant Examiner* — Juan D Valentin, II
(74) *Attorney, Agent, or Firm* — Gerhard W. Thielman, Esq.

(57) ABSTRACT

An optical gyroscope is provided for measuring a small angular difference. The gyroscope includes a laser, a pre-selection polarizer, a first beam splitter, a coil of optical fiber, a second beam splitter, a post-selection polarizer, a spectrometer and an analyzer. The laser emits a pulse beam of coherent photons. The beam has pulse duration $\sigma$. The pre-selection polarizer pre-selects the photons, and the first beam splitter separates the photons by their horizontal $|+\rangle$ and vertical $|-\rangle$ polarization eigenstates. These beams are launched into a fiber optical coil of radius r, which preserves polarization. The coil rotates by a difference rotation angle $\Delta\theta$. The second beam splitter recombines the polarized photon beams as they exit the coil. The post-selection polarizer post-selects the photons. The spectrometer captures the post-selected photons and measures the associated frequency translation $\delta\omega$. The analyzer determines the difference rotation angle as $$\Delta\theta = \pm\left(\frac{c\sigma^2\tan\chi}{2r}\right)\delta\omega,$$

such that c is speed of light, and $\chi$ is post-selection polarization phase angle.

2 Claims, 1 Drawing Sheet

(56) References Cited

OTHER PUBLICATIONS

A. Parks et al., "Observation and measurement of an optical AAV effect" *Proc. Roy. Soc. Lond. A*, 454 2997-3008 (1990).

K. Resch et al., "Nonlineaer Optics with Less than One Photon" *Phys. Lett. A*, 324 125 (2004).

Q. Wang et al., "Experimental demonstration of a method to realize weak measurement of the arrival time of a single", *Am.* photon, *Phys. Rev. A* 73, 2, 023814 (2006) http://pra.aps.org/pdf/PRA/v73/i2/e023814.

K. Yokota et al., "Direct observation of Hardy's paradox by joint weak measurement with an entangled photon pair", *New J. Phys.* 11, 033011 (2009) http://iopscience.iop.org/1367-2630/11/3/033011/pdf/1367-2630_11_3_033011.pdf.

P. Dixon et al., "Ultrasensitive Beam Deflection Measurement via Interferometric Weak Value Amplification", *Phys. Rev. Lett*, 102 173601 (2009). http://arxiv.org/PS_cache/arxiv/pdf/0906/0906.4828v1.pdf.

O. Hosten et al., "Observation of the Spin Hall Effect of Light via Weak Measurements", *Science* 319, 787 (2008).

N. Brunner et al., "Measuring small longitudinal phase shifts: weak measurements or standard interferometry?", *Phys. Rev. Lett.* 105, 1, 010405 (2010) http://arxiv.org/PS_cache/arxiv/pdf/0911/0911.5139v2.pdf.

R. Jozsa, "Complex weak values in quantum measurement", *Phys. Rev. A* 76, 044103 (2007). http://arxiv.org/PS_cache/arxiv/pdf/0706/0706.4207v1.pdf.

\* cited by examiner

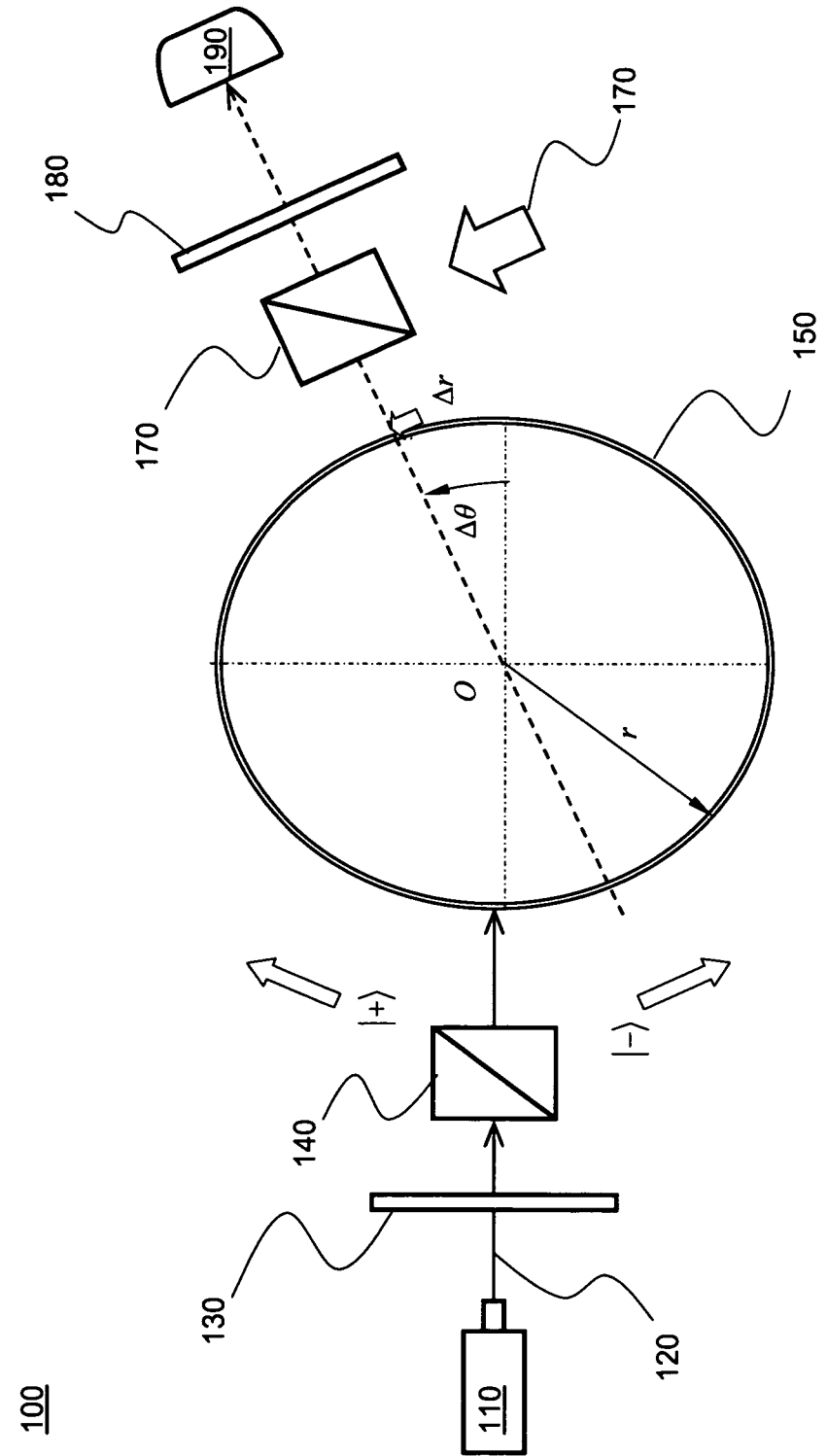

FIBER OPTICAL GYROSCOPE

STATEMENT OF GOVERNMENT INTEREST

The invention described was made in the performance of official duties by one or more employees of the Department of the Navy, and thus, the invention herein may be manufactured, used or licensed by or for the Government of the United States of America for governmental purposes without the payment of any royalties thereon or therefor.

BACKGROUND

The invention relates generally to fiber optical gyroscopes. In particular, the invention relates to devices designed to resolve very small angular shifts by quantum weak measurements.

A fiber optical gyroscope (FOG) measures or maintains orientation, analogous to the function of a mechanical gyroscope based on the principles of conservation of angular momentum. The FOG's principle of operation is instead based on the interference of light that passes through a coil of an optical fiber, and contains no moving components. FOGs have been employed for inertial navigation in guided missiles.

In a conventional FOG, a laser emits a beam of photons that are separated by a beam splitter into two polarized beams. Both beams enter into a single optical fiber but in opposite directions. Due to the Sagnac effect, the beam travelling against the rotation experiences a slightly shorter path delay than the other beam. Interferometry enables the resulting differential phase shift to be measured. This translates one component of angular velocity into an interference pattern shift that can be measured photometrically.

Beam-splitting optics launches light from a laser diode into two waves propagating in the clockwise and counter-clockwise directions through a coil consisting of many turns of optical fiber. The Sagnac effect's strength depends on the effective area of the closed optical path, and thus relates to the geometric area of the loop and the number of turns in the coil.

SUMMARY

Conventional fiber optical gyroscopes yield disadvantages addressed by various exemplary embodiments of the present invention. In particular, resolution of small angles can be enhanced using quantum weak measurement by embodiments described herein to improve precision.

Various exemplary embodiments provide an optical gyroscope for detecting an angular difference. The gyroscope includes a laser, a pre-selection polarizer, a first polarizing beam splitter, a coil of optical fiber, a second recombining beam splitter, a post-selection polarizer, a spectrometer and an analyzer. The laser emits a pulse beam of coherent photons. The beam has pulse duration $\sigma$. The pre-selection polarizer pre-selects the photons, and the polarizing beam splitter separates the photons by their horizontal $|+\rangle$ and vertical $|-\rangle$ polarization eigenstates.

The coil has radius $r$ and preserves the polarization of photons. The coil rotates during said pulse duration $\sigma$ by a difference rotation angle $\Delta\theta$. After beam recombination by the second beam splitter, the post-selection polarizer post-selects the photons. The spectrometer collects these photons and determines an associated frequency translator $\delta\omega$. The analyzer determines the difference rotation angle as $$\Delta\theta = \pm\left(\frac{c\sigma^2 \tan\chi}{2r}\right)\delta\omega,$$

such that $c$ is speed of light, and $\chi$ is a post-selection polarization phase angle.

BRIEF DESCRIPTION OF THE DRAWINGS

These and various other features and aspects of various exemplary embodiments will be readily understood with reference to the following detailed description taken in conjunction with the accompanying drawings, in which like or similar numbers are used throughout, and in which:

FIGURE is a schematic view of an AAV fiber optical gyroscope.

DETAILED DESCRIPTION

In the following detailed description of exemplary embodiments of the invention, reference is made to the accompanying drawings that form a part hereof, and in which is shown by way of illustration specific exemplary embodiments in which the invention may be practiced. These embodiments are described in sufficient detail to enable those skilled in the art to practice the invention. Other embodiments may be utilized, and logical, mechanical, and other changes may be made without departing from the spirit or scope of the present invention. The following detailed description is, therefore, not to be taken in a limiting sense, and the scope of the present invention is defined only by the appended claims.

In accordance with a presently preferred embodiment of the present invention, the components, process steps, and/or data structures may be implemented using various types of operating systems, computing platforms, computer programs, and/or general purpose machines. In addition, those of ordinary skill in the art will readily recognize that devices of a less general purpose nature, such as hardwired devices, or the like, may also be used without departing from the scope and spirit of the inventive concepts disclosed herewith. General purpose machines include devices that execute instruction code. A hardwired device may constitute an application specific integrated circuit (ASIC) or a floating point gate array (FPGA) or other related component.

Various exemplary embodiments provide a fiber optical gyroscope that uses the Aharonov-Albert-Vaidman (AAV) amplification effect. Photons in a laser pulse that have traversed a circular rotation sensing loop of fiber and have their polarization states pre- and post-selected yield a frequency shift produced by the rotation of the fiber. A pure imaginary weak value amplifies small frequency shifts from which small rotation angles are obtained. When ideal conditions prevail, rotation angles of ~750 femtoradians can be measured.

The weak value $A_w$ of a quantum mechanical observable $\hat{A}$ was described a quarter century ago by Y. Aharonov et al., "How the Result of a Measurement of a Component of the Spin of a Spin-½ Particle Can Turn Out to be 100", *Phys. Rev. Lett.* 60, 14, 1351 (1988) and known as "AAV." See http://www.tau.ac.il/~vaidman/1vhp/m8.pdf for details.

This weak quantity is the statistical result of a standard measurement procedure performed upon a pre- and post-selected (PPS) ensemble of quantum systems when the interaction between the measurement apparatus and each system is sufficiently weak, i.e., when it is a weak measurement. Unlike a standard strong measurement of $\hat{A}$, which significantly disturbs the measured system (i.e., it "collapses" the wavefunction), a weak measurement of observable Â for a PPS system does not appreciably disturb the quantum system and yields $A_w$ as the observable's measured value.

The peculiar nature of the virtually undisturbed quantum reality that exists between the boundaries defined by the PPS states is revealed in the eccentric characteristics of $A_w$, namely that (i) $A_w$ can be complex valued;
(ii) Re $A_w$ can lie far outside the eigenvalue spectrum limits of operator Â; and
(iii) the magnitude of Im $A_w$ can be extremely large.

Characteristics (ii) and (iii) are referred to as the AAV amplification effect.

Experiments have verified several of the interesting unusual properties predicted by weak value theory. These include reports by N. Ritchie et al., "Realization of a Measurement of a 'Weak Value'", *Phys. Rev. Lett.* 66, 1107 (1991); A. Parks et al., "An Optical Aharonov-Albert-Vaidman Effect", *Proc. R. Soc. A* 454, 2997 (1998); K. Resch et al., "Nonlinear Optics with Less than One Photon", *Phys. Lett. A* 324, 125 (2004); Q. Wang et al., "Experimental demonstration of a method to realize weak measurement of the arrival time of a single photon", *Phys. Rev. A* 73, 2, 023814 (2006); K. Yokota et al., "Direct observation of Hardy's paradox by joint weak measurement with an entangled photon pair", *New J. Phys.* 11, 033011 (2009); P. Dixon et al., "Ultrasensitive Beam Deflection Measurement via Interferometric Weak Value Amplification", *Phys. Rev. Lett.* 102, 173601. Further, an AAV amplification of $10^4$ (i.e., ten-thousand) has recently been achieved and used to observe the previously unobserved spin Hall effect of light, as reported by O. Hosten et al., in "Observation of the Spin Hall Effect of Light via Weak Measurements", *Science* 319, 787 (2008).

This disclosure describes a concept for a fiber optical gyroscope (and rotation angle sensor)—the Aharonov-Albert-Vaidman effect fiber optical gyroscope AAVFOG that uses the AAV amplification effect along with associated findings recently supported by N. Brunner et al., "Measuring small longitudinal phase shifts: weak measurements or standard interferometry?", *Phys. Rev. Lett.* 105, 1, 010405 (2010) to amplify small rotations detected by a loop of fiber optical cable. See http://arxiv.org/PS_cache/arxiv/pdf/0911/0911.5139v2.pdf for details. Under certain ideal conditions, rotation angles on the order of several hundred femtoradians can be measured.

The following presents a brief review of weak measurement and weak value theory. Weak measurements arise in the von Neumann description of a quantum measurement at time $t_0$ of a time-independent observable Â that describes a quantum system in an initial fixed pre-selected state $|\psi_i\rangle$ at $t_0$.

In this description, the Hamiltonian Ĥ for the interaction between the measurement apparatus and the quantum system is:

$$\hat{H} = \gamma(t) \hat{A} \hat{p}. \tag{1}$$

Here, interaction strength:

$$\gamma(t) = \gamma \delta(t - t_0), \tag{2}$$

defines the strength of the measurement's impulsive interaction at $t_0$, $\hat{p}$ is the momentum operator for the pointer of the measurement apparatus, which is in the initial normalized state $|\phi\rangle$, and the Dirac delta function $\delta(t-t_0)$ models the interaction effectively as an impulsive interaction between a photon of the beam and the measurement apparatus at time $t_0$.

Let $\hat{q}$ be the pointer's position operator that is conjugate to $\hat{p}$. Prior to the measurement, the pre-selected system and the pointer are in the tensor product state $|\psi_i\rangle|\phi\rangle$. Immediately following the interaction, the combined system is in the state:

$$|\Phi\rangle = e^{-\frac{i}{\hbar} \int \hat{H} dt} |\psi_i\rangle|\phi\rangle = e^{-\frac{i}{\hbar} \gamma \hat{A} \hat{p}} |\psi_i\rangle|\phi\rangle, \tag{3}$$

where use has been made of the fact that:

$$\int \hat{H} dt = \gamma \hat{A} \hat{p}. \tag{4}$$

Also, one may note that $i=\sqrt{-1}$ is the imaginary unit, and that $$\hbar = \frac{h}{2\pi}$$

represents the reduced Planck constant.

Here, the unitary evolution operator $$e^{-\frac{i}{\hbar} \gamma \hat{A} \hat{p}}$$

in eqn. (3) is referred to as the von Neumann interaction operator. If a state $|\psi_f\rangle$ is then post-selected, the resulting pointer state for the PPS system is:

$$|\Psi\rangle \equiv \langle \psi_f | \Phi \rangle = \langle \psi_f | e^{-\frac{i}{\hbar} \gamma \hat{A} \hat{p}} | \psi_i \rangle |\phi\rangle. \tag{5}$$

Note that the probability of successfully obtaining a measured system in the post-selected state $|\psi_f\rangle$ is $|\langle \psi_f | \psi_i \rangle|^2$.

A weak measurement of Â occurs when the interaction strength $\gamma$ is sufficiently small so that the system is essentially undisturbed and the uncertainty $\Delta q$ is much larger than Â's eigenvalue separation. In this case eqn. (5) becomes:

$$|\Psi\rangle \approx \langle \psi_f | \left(1 - \frac{i}{\hbar} \gamma \hat{A} \hat{p}\right) |\psi_i\rangle |\phi\rangle = \langle \psi_f | \psi_i \rangle \left(1 - \frac{i}{\hbar} \gamma A_w \hat{p}\right) |\phi\rangle, \tag{6}$$

or else as:

$$|\Psi\rangle \approx \langle \psi_f | \psi_i \rangle e^{-\frac{i}{\hbar} \gamma A_w \hat{p}} |\phi\rangle. \tag{7}$$

Here, the weak value $A_w$ of the operator Â is defined by:

$$A_w \equiv \frac{\langle \psi_f | \hat{A} | \psi_i \rangle}{\langle \psi_f | \psi_i \rangle}. \tag{8}$$

The exponential operator in eqn. (7) is the translation operator $\hat{S}(\gamma A_w)$ for the initial normalized pointer state $|\phi\rangle$ in the q representation. The translation operator is defined by the action:

$$\langle q | \hat{S}(\gamma A_w) | \phi \rangle = \phi(q - \gamma A_w), \tag{9}$$

which translates the pointer's wave-function over a distance $\gamma A_w$ parallel to the q-axis.

Weak measurements can be performed in position space or else in momentum space. These measurements can be conducted upon an ensemble of identical PPS systems. Based on the initial normalized pointer state $|\phi\rangle$, the initial mean pointer position is:

$$q_i \equiv \langle \phi | \hat{q} | \phi \rangle, \tag{10}$$

and the initial mean pointer momentum is:

$$p_i \equiv \langle \phi | \hat{p} | \phi \rangle, \tag{11}$$

whereas based on the final post-measured pointer state $|\Psi\rangle$, the pointer's final mean post-measurement position is:

$$q_f \equiv \langle \Psi | \hat{q} | \Psi \rangle, \tag{12}$$

and its final mean post-measurement momentum is:

$$p_f \equiv \langle \Psi | \hat{p} | \Psi \rangle. \tag{13}$$

The differences between these values provide information about weak value $A_w$. R. Jozsa provides these differences in "Complex weak values in quantum measurement", *Phys. Rev. A* 76, 044103 (2007), with details at http://arxiv.org/PS_cache/arxiv/pdf/0706/0706.4207v1.pdf. For the general case in which both the weak value $A_w$ and the initial pointer state $\phi(q)$ are complex valued, the translation in the mean pointer position is:

$$\delta q \equiv q_f - q_i = \gamma \operatorname{Re} A_w + \left(\frac{m\gamma}{\hbar}\right)\left(\frac{d\Delta_\varphi^2 q}{dt}\right) \operatorname{Im} A_w, \tag{14}$$

and the translation in the mean pointer momentum is:

$$\delta p \equiv p_f - p_i = 2\left(\frac{\gamma}{\hbar}\right)(\Delta_\varphi^2 p) \operatorname{Im} A_w. \tag{15}$$

Here, m is the mass of the pointer, $\Delta_\phi^2 q$ and $\Delta_\phi^2 p$ are the initial pointer position and momentum variances, and the time derivative is the rate of change of the initial pointer position variance just prior to $t_0$.

The FIGURE shows a schematic view 100 of an exemplary AAVFOG. The view 100 shows the apparatus being disposed in the plane of the image and rotating about point O. A laser 110 emits a coherent light beam 120, which passes through a pre-selection polarizer 130 and subsequently through a first polarizing beam splitter 140.

The beam splitter 140 divides the pre-selected photons according to their horizontal and vertical polarization states, $|+\rangle$ and $|-\rangle$ respectively. As shown, the horizontally and vertically polarized photon beams traverse a polarization-preserving optical fiber in the form of a circular coil 150 having a radius r. The fiber 150 rotates counter-clockwise indicated by direction arrows 160 through angle $\Delta\theta$ around point O, shifting the two beams along the circumference arc by $\Delta r$. The shifted beams are recombined by a second recombining beam splitter 170 and pass through a post-selection polarizer 180 before reaching a spectrometer 190 for detection of the frequency translator $\delta\omega$.

In the AAVFOG in the schematic view 100, the laser 110 emits a beam 120 as a pulse of temporal width σ, with the photon polarization being pre-selected by the polarizer 130 before being intercepted by the first beam splitter 140, which segregates the pulse photons according to their linear polarization state. These photons are injected into the circular coil 150 of radius r of the polarization preserving optical fiber such that photons in the horizontal polarization state $|+\rangle$ traverse the coil 150 unchanged in the clockwise (CW) direction, and photons in the vertical polarization state $|-\rangle$ traverse the coil 150 unchanged in the counter-clockwise (CCW) direction.

The photons exit the fiber coil 150 and are recombined by the second beam splitter 170. The polarization states of the recombined collection of photons are post-selected by the second polarizer 180 as they exit one of the output ports of the second beam splitter 170. These photons are then analyzed by the spectrometer 190 to determine the frequency translator $\delta\omega$ and the associated rotation angle $\Delta\theta$.

For the case shown in the FIGURE in which the apparatus rotates in the CCW direction 160 about point O, during the time that the photons are traversing the fiber, the coil 150 rotates through a difference angle $\Delta\theta = \Delta r/r$. The photons in the horizontal state $|+\rangle$ travel an arc length $\Delta r$ less than the half-circumference of the coil 150, and arrive at the second beam splitter 170 at time earlier by:

$$\tau = \frac{\Delta r}{c}, \tag{16}$$

than they would if no rotation occurred, as:

$$\Delta\theta = 0. \tag{17}$$

Similarly, the photons in vertical state $|-\rangle$ that travel an arc length $\Delta r$ more than the half-circumference and arrive at the second beam splitter 170 at time later by $$\tau = \frac{\Delta r}{c}$$

from eqn. (16) later than they would if $\Delta\theta = 0$ from eqn. (17).

Thus, after the CW and CCW pulses are recombined by the second beam splitter 170, the resultant emergent light is a superposition of the "early" pulse with photons in horizontal state $|+\rangle$ and the "late" photons with photons in vertical state $|-\rangle$. This dynamic, which is introduced by the beam splitters 140 and 170 and the fiber coil 150 of the apparatus is described for the CCW rotation by the von Neumann evolution operator $$e^{-\frac{i}{\hbar}\hat{A}_{CCW}\hat{p}},$$

where:

$$\hat{A}_{CCW} = (-\Delta r)|+\rangle\langle+| + (\Delta r)|-\rangle\langle-| \tag{18}$$

is the associated photon "which path" operator. Note that because $\hat{A}_{ccw}$ has length as its dimension, then interaction strength is unity as $\gamma = 1$ in the CCW von Neumann operator.

To verify that $\hat{A}_{CCW}$ produces the required state of light emerging from the second beam splitter 180, one can employ the facts that:

$$(|\pm\rangle\langle\pm|)^n = |\pm\rangle\langle\pm|, \tag{19}$$

and for n=1:

$$|\pm\rangle\langle\pm|\mp\rangle\langle\mp| = 0 \tag{20}$$

and observe that:

$$\hat{A}_{CCW}^n = (-\Delta r)^n|+\rangle\langle+| + (\Delta r)^n|-\rangle\langle-|. \tag{21}$$

Applying eqn. (21) to the CCW von Neumann operator yields:

$$e^{-\frac{i}{\hbar}\gamma \hat{A}_{CCW}\hat{p}} = \sum_{n=0}^{\infty}\frac{\left[-\frac{i}{\hbar}\hat{p}\right]^n}{n!}\hat{A}_{CCW}^n = \quad (22)$$

$$\sum_{n=0}^{\infty}\frac{\left[-\frac{i}{\hbar}(-\Delta r)\hat{p}\right]^n}{n!}|+\rangle\langle+| + \sum_{n=0}^{\infty}\frac{\left[-\frac{i}{\hbar}(\Delta r)\hat{p}\right]^n}{n!}|-\rangle\langle-|,$$

or $$e^{-\frac{i}{\hbar}\gamma \hat{A}_{CCW}\hat{p}} = e^{-\frac{i}{\hbar}(-\Delta r)\hat{p}}|+\rangle\langle+| + e^{-\frac{i}{\hbar}(-\Delta r)\hat{p}}|-\rangle\langle-|. \quad (23)$$

Let the pulse serve as the measurement pointer with $|\phi\rangle$ as its initial state and let:

$$|\psi_i\rangle = \alpha|+\rangle + \beta|-\rangle \quad (24)$$

be the pre-selected polarization state for the pulse photons. The action of the von Neumann operator upon the tensor product state $|\psi_i\rangle|\phi\rangle$ produces the state:

$$|\Psi\rangle = e^{-\frac{i}{\hbar}\gamma \hat{A}_{CCW}\hat{p}}|\psi_i\rangle|\varphi\rangle = \alpha e^{-\frac{i}{\hbar}(-\Delta r)\hat{p}}|+\rangle|\varphi\rangle + \beta e^{-\frac{i}{\hbar}(\Delta r)\hat{p}}|-\rangle|\varphi\rangle. \quad (25)$$

In the q representation, this becomes:

$$\langle q|\Phi\rangle = \alpha\langle q|e^{-\frac{i}{\hbar}(-\Delta r)\hat{p}}|\varphi\rangle|+\rangle + \beta\langle q|e^{-\frac{i}{\hbar}(\Delta r)\hat{p}}|\varphi\rangle|-\rangle, \quad (26)$$

or $$\Phi(q) = \alpha\varphi(q + \Delta r)|+\rangle + \beta\varphi(q - \Delta r)|-\rangle. \quad (27)$$

This state in eqn. (27) is the required superposition of the "early" pulse with photons in horizontal state $|+\rangle$, i.e., $\phi(q+\Delta r)|+\rangle$ and the "late" pulse with photons in vertical state $|-\rangle$, i.e., $\phi(q-\Delta r)|-\rangle$.

It is now advantageous to redefine the "which path" operator as:

$$\hat{A}_{CCW} \equiv \Delta r \hat{B}_{CCW}, \quad (28)$$

where:

$$\hat{B}_{CCW} = -|+\rangle\langle+| + |-\rangle\langle-|, \quad (29)$$

so that the CCW von Neumann operator can be rewritten as:

$$e^{-\frac{i}{\hbar}\hat{A}_{CCW}\hat{p}} = e^{-\frac{i}{\hbar}\Delta r\hat{B}_{CCW}\hat{p}}. \quad (30)$$

Note that now the arc shift $\Delta r$ is effectively the interaction strength, such that:

$$\gamma = \Delta r \quad (31)$$

If the arc shift $\Delta r$ is sufficiently small, and also the pulse width:

$$\sigma \gg \frac{\Delta r}{c}, \quad (32)$$

greatly exceeds the rotation time constant so that the measurement is weak, then substitution of eqn. (30) into eqn. (7) yields:

$$|\Psi\rangle \approx \langle\psi_f|\psi_i\rangle e^{-\frac{i}{\hbar}\Delta r(\hat{B}_{CCW})_w \hat{p}}|\varphi\rangle. \quad (33)$$

After using eqn. (24) as the pre-selected polarization state and:

$$|\psi_f\rangle = \eta|+\rangle + \mu|-\rangle, \quad (34)$$

as the post-selected polarization state, one can determine from eqn. (8) that:

$$(B_{CCW})_w = -\left(\frac{\alpha\eta^* - \beta\mu^*}{\alpha\eta^* + \beta\mu^*}\right), \quad (35)$$

where $\eta^*$ and $\mu^*$ represent complex conjugates of the post-selection coefficients.

One can choose these PPS states such that:

$$\alpha = \frac{1}{\sqrt{2}} = \frac{\sqrt{2}}{2}, \text{ and } \beta = \frac{i}{\sqrt{2}} = \frac{i\sqrt{2}}{2}, \quad (36)$$

for the pre-selection, and $$\eta = \frac{ie^{i\chi}}{\sqrt{2}} = \frac{ie^{i\chi}\sqrt{2}}{2}, \text{ and } \mu = \frac{e^{-i\chi}}{\sqrt{2}} = \frac{e^{-i\chi}\sqrt{2}}{2}, \quad (37)$$

for the post-selection, where $\chi$ is the polarization phase angle. This yields:

$$(B_{CCW})_w = i\cot\chi, \quad (38)$$

as the pure imaginary weak value of $\hat{B}_{CCW}$.

Because the pulse serves as the pointer, then application of eqn. (15) provides the following expression for the pointer translation in momentum space:

$$\hbar k_f - \hbar k_i = \hbar(k_f - k_i) = -2\left(\frac{\Delta r}{\hbar}\right)(\hbar^2\Delta^2 k_i)\cot\chi. \quad (39)$$

Here $k_i$ and $k_f$ are the initial and final wave numbers for the pulse, and $\Delta^2 k_i$ is the initial wave number variance. In order to convert this into the associated frequency translation $\delta\omega$ of the pulse as measured by the spectrometer, divide out the reduced Planck number $\hbar$ factors, multiply both sides of the eqn. (39) by the speed of light c, and use the fact that:

$$\omega = ck \quad (40)$$

to obtain:

$$\delta\omega \equiv \omega_f - \omega_f - \omega_i = -2c(\Delta r)(\Delta^2 k_i)\cot\chi. \quad (41)$$

Applying to eqn. (39) the fact that the spatial width $c\sigma$ of the pulse is related to $\Delta k_i$ according to:

$$\Delta k_i = (c\sigma)^{-1} \quad (42)$$

finally yields:

$$\delta\omega = -2\left(\frac{\tau}{\sigma^2}\right)\cot\chi, \quad (43)$$

where $\tau$ is defined by eqn. (16).

The condition in which the apparatus rotates about point O in the CW direction instead of the CCW direction is obtained by replacing $\Delta r$ with $-\Delta r$, replacing $-\Delta r$ with $\Delta r$ (i.e., replacing $\pm \Delta r$ with $\mp \Delta r$), and substituting the subscript CCW by the counterpart CW for eqns. (18) through (35). This results in the following relationship between the weak values for the CCW and CW "which path" operators:

$$(B_{CW})_w = -(B_{CCW})_w. \quad (44)$$

Consequently, eqn. (43) can now be rewritten for both the CCW and CW rotation cases in the compact form:

$$\delta\omega = \pm 2\left(\frac{\tau}{\sigma^2}\right)\cot\chi, \quad (45)$$

where the "+" applies if the rotation is in the CW direction and the "−" applies if the rotation is in the CCW direction. In either case, the observed frequency translation $\delta\omega$ can be greatly amplified when $\chi$ is small.

This enables determination of a very small $\tau$ or equivalently a very small rotation angle $\Delta\theta$ from the measured value of $\delta\omega$ when pulse width $\sigma$, polarization phase angle $\chi$ and coil radius r are fixed and known. Thus:

$$\tau = \pm\left(\frac{\sigma^2 \tan\chi}{2}\right)\delta\omega, \quad (46)$$

or $$\Delta\theta = \pm\left(\frac{c\sigma^2 \tan\chi}{2r}\right)\delta\omega, \quad (47)$$

for determining values of time constant $\tau$ and measurable angle difference $\Delta\theta$.

Values from Brunner are used to estimate $\Delta\theta$. One can assume that the operational wavelength of the pulsed laser is $\lambda=700$ nm (red light). A pulsed titanium (Ti): sapphire ($Al_2O_3$) laser operating at this wavelength can generate a pulse with a $5\times10^{-15}$ s temporal width and currently available spectrometers have a spectral resolution of about $2\times10^{10}$ Hz at $\lambda=700$ nm.

Using these values for $\sigma=5\times10^{-15}$ s and $\delta\omega=2\times10^{10}$ Hz, along with $c=3\times10^8$ m·s$^{-1}$, $\chi=10^{-3}$ rad, and $r=0.1$ m, then eqn. (47) yields an ideal rotation angle of:

$$\Delta\theta_{ideal} = \pm 7.5\times10^{-13} \text{ rad}, \quad (48)$$

as an estimate for the achievable value of $\Delta\theta$ that can be measured under "ideal" conditions.

However, this result does not account for any required measurement integration times. In order to obtain a crude estimate of the integration time, assume that $\Delta\theta$ is stationary during the measurement integration time interval T, and let I be the intensity associated with the laser pulse.

Then the intensity reaching the spectrometer per pulse is:

$$I|\langle\psi_f|\psi_i\rangle|^2 = I\sin^2\chi, \quad (49)$$

where $|\langle\psi_f|\psi_i\rangle|^2$ is the probability of post-selecting a photon in final state $|\psi_f\rangle$. If $I_{req}$ is the intensity required for a spectroscopic measurement, then the number N of pulses needed is approximately:

$$N \approx \frac{I_{req}}{I\sin^2\chi}, \quad (50)$$

and if $\rho$ is the pulse repetition rate, then the estimated measurement integration time $T_{est}$ is:

$$T_{est} \approx \frac{N}{\rho} = \frac{I_{req}}{I\rho\sin^2\chi}. \quad (51)$$

Assuming that:

$$I_{req} \approx I \quad (52)$$

and using $\rho \approx 10^2$ MHz, and $\chi \approx -3$ rad in the eqn. (51) yields $$T_{est} \approx 10^{-2} \text{ s}. \quad (53)$$

This suggests that precision $\Delta\theta$ measurements can be made by this device to provide direction and rate of change data at a frequency that renders it viable for gyroscopic applications.

While certain features of the embodiments of the invention have been illustrated as described herein, many modifications, substitutions, changes and equivalents will now occur to those skilled in the art. It is, therefore, to be understood that the appended claims are intended to cover all such modifications and changes as fall within the true spirit of the embodiments.

What is claimed is:

1. An optical gyroscope for detecting an angular difference, said gyroscope comprising:
    a laser for emitting a pulse beam of coherent photons, said beam having pulse duration $\sigma$;
    a pre-selection polarizer for pre-selecting said coherent photons as polarized photons;
    a polarizing beam splitter for separating said polarized photons by their horizontal $|+\rangle$ and vertical $|-\rangle$ polarization eigenstates as separated photons;
    a coil of optical fiber having radius r, said coil being rotated by a difference rotation angle $\Delta\theta$, said coil preserving polarization of said separated photons;
    a recombining beam splitter for recombining said separated photons from said coil as recombined photons;
    a post-selection polarizer for post-selecting said recombined photons as selected photons;
    a spectrometer for capturing said selected photons and measuring associated frequency translation $\delta\omega$; and
    an analyzer for determining said difference rotation angle as $$\Delta\theta = \pm\left(\frac{c\sigma^2 \tan\chi}{2r}\right)\delta\omega,$$

wherein c is speed of light, and $\chi$ is polarization shift angle.

2. The gyroscope according to claim 1, wherein probability of post-selecting a photon of said beam relates to said polarization phase angle $\chi$ as $|\langle\psi_f|\psi_i\rangle|^2 = \sin^2\chi$, such that initial state is $|\psi_i\rangle$, and final state is $|\psi_f\rangle$.

* * * * *